(12) United States Patent
Keane

(10) Patent No.: US 7,219,562 B2
(45) Date of Patent: May 22, 2007

(54) ANGLE SENSOR

(76) Inventor: Padraig Joseph Keane, 14 Estuary Walk, Ballynoe, Cobh, County Cork (IE)

( * ) Notice: Subject to any disclaimer, the term of this patent is extended or adjusted under 35 U.S.C. 154(b) by 9 days.

(21) Appl. No.: 10/513,814

(22) PCT Filed: May 12, 2003

(86) PCT No.: PCT/IE03/00074

§ 371 (c)(1),
(2), (4) Date: Feb. 4, 2005

(87) PCT Pub. No.: WO03/095938

PCT Pub. Date: Nov. 20, 2003

(65) Prior Publication Data

US 2005/0116706 A1 Jun. 2, 2005

(30) Foreign Application Priority Data

May 10, 2002 (IE) ............................... S2002/0379

(51) Int. Cl.
*G01L 3/00* (2006.01)
(52) U.S. Cl. .......................... 73/862.331; 73/862.332; 73/862.333; 73/862.335; 324/207.2; 324/207.21; 324/207.22; 324/207.25
(58) Field of Classification Search ........... 73/862.331, 73/862.332; 324/207.21, 207.25
See application file for complete search history.

(56) References Cited

U.S. PATENT DOCUMENTS

| | | | | |
|---|---|---|---|---|
| 4,984,463 A | * | 1/1991 | Idogaki et al. ........... | 73/514.08 |
| 5,532,564 A | | 7/1996 | Zorzolo ....................... | 318/551 |
| 5,789,917 A | | 8/1998 | Oudet et al. ................. | 324/207 |
| 5,818,223 A | * | 10/1998 | Wolf ...................... | 324/207.12 |
| 5,854,429 A | * | 12/1998 | Haudebert et al. ....... | 73/861.13 |
| 5,861,745 A | * | 1/1999 | Herden ..................... | 324/207.2 |
| 6,201,389 B1 | * | 3/2001 | Apel et al. ............... | 324/207.2 |
| 6,472,865 B1 | | 10/2002 | Tola et al. ................... | 324/207 |
| 6,518,750 B1 | * | 2/2003 | Lin et al. .................. | 324/207.2 |
| 6,948,383 B2 | * | 9/2005 | Wilczek ................ | 73/862.332 |
| 7,023,202 B2 | * | 4/2006 | Hagino et al. ......... | 324/207.25 |
| 7,034,525 B2 | * | 4/2006 | Mizutani et al. ....... | 324/207.25 |
| 2004/0100252 A1 | * | 5/2004 | Babin ..................... | 324/207.25 |
| 2005/0140361 A1 | * | 6/2005 | Gandel et al. ......... | 324/207.21 |
| 2006/0220638 A1 | * | 10/2006 | Urquidi et al. ......... | 324/207.25 |

FOREIGN PATENT DOCUMENTS

| | | |
|---|---|---|
| DE | 19955573 A1 | 5/2001 |
| EP | 0514530 B1 | 11/1996 |
| EP | 0665416 B1 | 5/1998 |
| EP | 1143220 B1 | 6/2003 |

* cited by examiner

*Primary Examiner*—Edward Lefkowitz
*Assistant Examiner*—Freddie Kirkland, III
(74) *Attorney, Agent, or Firm*—Jacobson Holman PLLC

(57) ABSTRACT

The invention provides an angular position sensor (1) comprising two magnets (32, 33) attached to the inside face of a rotor (31) for generating a magnetic field (50) and a magnetism detection device (43) disposed in the magnetic field (50). The magnets (32, 33) are arranged substantially opposite each other with a pole of opposite polarity of each magnet (32, 33) directed towards the center of the rotor (31). A uniform magnetic field (50) is generated around the magnetism detection device (43) which provides more accurate sensor measurements over both small and large angles of rotation of the rotor (31). Furthermore, the magnets (32, 33) need only be axially magnetised which simplifies construction of the sensor.

13 Claims, 9 Drawing Sheets

Figure 1:
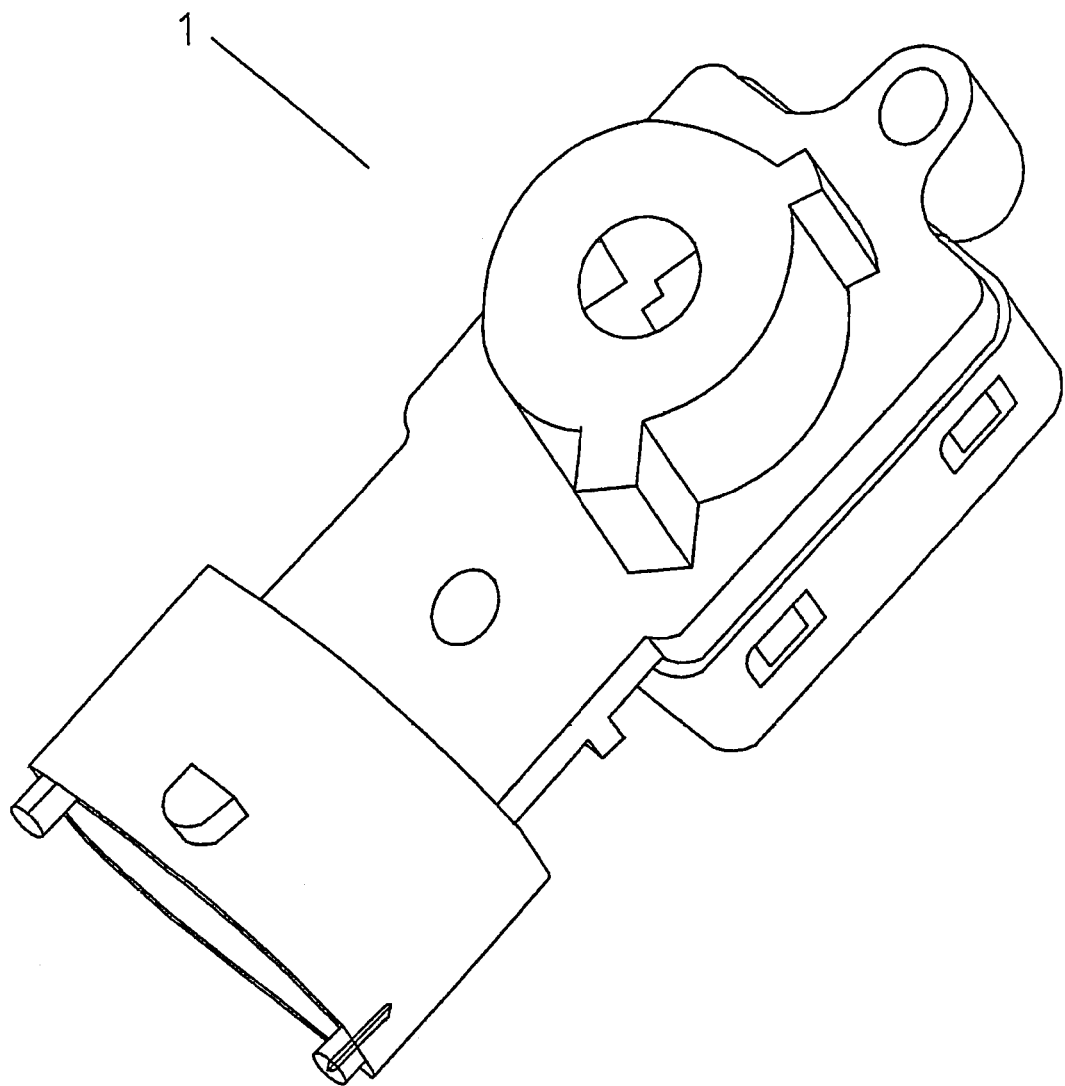

Very good Linearity on a short stroke (+/- 20°)

...And also on a large stroke (+/- 50°)

Linearity keeps under +/- 0.25% when off-centered 0.25 mm along X or Y axis

ANGLE SENSOR

This is a nationalization of PCT/IE03/00074 filed May 12, 2003 and published in English.

INTRODUCTION

The present invention relates to an angular position sensor comprising two magnets attached to a rotor for generating a magnetic field and a magnetism detection device disposed in the magnetic field for detecting changes in the magnetic field on rotation of the rotor so that the angular position of the rotor is detected based on the changes in the magnetic field to provide an output signal from the magnetism detection device indicating the angular position of the rotor. In particular the invention relates to an angular position sensor for use in the automotive industry.

A position sensor is an electro-mechanical device used to convey the position of an item or an object to a control device. In industry, these position sensors are known as non-contacting position sensors. Strictly speaking, it is not true to say non-contacting as there is contact between the bearing faces of so called non contacting sensors. However, the position or angle detecting components do not come into contact with each other and as a result are more resilient to wearing out, hence the term non-contacting. The invention is primarily concerned with non-contacting sensors.

In industry it is highly desirable to provide a low cost, easy to manufacture and accurate angular position sensors. In the automotive industry it is envisaged that angular position sensors will be installed in many if not all future accelerator pedal applications due to environmental legislation requiring greater control of the automotive combustion process. The application requires accurate sensing over small angles of rotation. Angular position sensors are also required for throttle valves and exhaust gas recirculation valves which require accurate sensing over large angles of rotation. As automotive manufacturers usually utilize the same technology for similar but different applications throughout a vehicle it is necessary to be able to mass produce an angular position sensor which is accurate for detecting both small and large angles of rotation.

The angular position sensors generally disclosed by the prior art utilise one radial magnetised magnet only in the rotor for generating a magnetic field. A major problem is that this radial magnetisation requirement means that the magnet is difficult and hence more expensive to manufacture. A further problem is that the volume of magnetic material necessary to make the magnets makes these position sensors more expensive. Examples of prior art angular position sensors are disclosed in U.S. Pat. No. 5,789,917, European Publication Nos. EP 0514530 and EP 0665416 (all Moving Magnet Technology Inc.)

A position sensor is disclosed by U.S. Pat. No. 5,818,223 (Durakool Inc.) which discloses an angular position sensor for sensing the angular position of a pivotally mounted device attached to a rotor disposed in a predetermined housing about a rotor axis. Again, this US Patent Specification discloses one magnet only, which is circular in shape. This leads to the problem that the tooling required to manufacture is expensive while magnetising the magnets is difficult because the magnets need to be magnetised radially to achieve high accuracy.

U.S. Pat. No. 6,472,865 (Wabash Technologies Inc.) discloses a magnetic rotational position sensor having one magnet only connected to the inside face of a rotor in which one of the poles of the magnet is directed towards the centre of the rotor. However the magnetic field prematurely flows to the rotor due to the lack of stator pieces to guide it and hence does not flow at 90 degrees to the magnetism detection device, hence the sensor is not accurate especially for large angular changes of rotation of the rotor.

A major problem with existing non-contacting angular position sensors as described above is that they are not accurate for both small angles and large angles of rotation. European Publication No. EP 1143220 (Denso Corporation) discloses an angular position detection device which has a rotor which comprises two magnets. The two magnets are partially semi-circular in shape and the poles of the magnet are arranged around the circumference of the rotor. A problem with this European patent specification is that this technology relies on offsetting the stator pieces and magnetism detection device from the axis of rotation of the rotor and magnets. It also relies on two circumferentially magnetised magnets which are semicircular in cross section. This means that while the sensor is relatively accurate, it is not accurate for sensing both small angles and large angles of rotation. This is a particular problem, for example, in the automotive industry which requires angular position sensors which are accurate over a small and large range of rotation for example foot pedals of a vehicle and engine throttle valve sensing of the vehicle. This European publication further discloses a singular magnet in which one of the pole ends is faced towards the centre of rotation of the rotor. However, again this suffers from the same problem as U.S. Pat. No. 6,472,865 in that the offset magnetic field will not produce high accuracy over small and large angles of rotation. It also suffers partially from the same problem as U.S. Pat. No. 6,472,865 in that although there are flux concentrators without a second magnet to ensure the magnetic field is pulled through the magnetism detection device there will be premature field deviation to the rotor hence once again affecting the accuracy.

The present invention is therefore directed towards providing an accurate low cost angular position sensor, and in particular for use in the automotive industry, to overcome the above-mentioned problems.

STATEMENTS OF INVENTION

According to the present invention there is provided an angular position sensor comprising two magnets attached to a rotor for generating a magnetic field and a magnetism detection device disposed in the magnetic field for detecting changes in the magnetic field on rotation of the rotor so that the angular position of the rotor is detected based on the changes in the magnetic field to provide an output signal from the magnetism detection device indicating the angular position of the rotor characterised in that the magnets are positioned substantially opposite each other, a pole of one magnet facing a pole of the other magnet and the two other poles facing away from each other.

The advantage of the present invention is that it provides a more accurate sensor over large and small angles of rotation and taking into account that radial magnetization cannot be achieved fully in practice this means that actual sensors will have a larger accuracy margin over the prior art. The term substantially opposite means one pole faces a pole of the other magnet substantially along the one diameter of the rotor. Preferably the axis line formed by the two magnets substantially intersects the centre axis of rotation of the rotor.

Ideally the facing poles of each magnet are of opposite polarity.

In one embodiment there is provided an angular position sensor in which a flux concentrating stator is provided comprising a pair of stator pieces positioned substantially on either side of the magnetism detection device.

The use of two magnets and two stator pieces ensures that magnetic flux flows through the magnetism detection device and there is no straying of the magnetic field prematurely i.e. before it flows through the magnetism detection device. Also that the magnetic field remains for example at 90 degrees approx. to the face of the magnetism detection device and hence the magnetism detection device only experiences a variation in inductance as the rotor is rotated. With some of the prior art sensors i.e. Wabash and the Denso single magnet there will be magnetic field straying prematurely to the rotor and the field will not always be at for example 90 degrees to the magnetism detection device hence diminishing accuracy.

In another embodiment the stator pieces are substantially on the same axis line formed by the two magnets when in a fully saturated position.

In a further embodiment the magnetism detection device and the stator pieces are positioned offset from the centre of the rotor.

Preferably the magnets are attached to the inside face of the rotor.

Ideally the magnetism detection device is one of a hall effect device, an integrated circuit or a GMR device.

Preferably the magnets are axially magnetised.

It will be appreciated that the present invention only uses magnets which have to be axially magnetised. Radial and various other magnetising requires complicated and expensive magnetising fixtures or heads which require constant calibration and long cycle times hence pushing up the component cost. Also due to the current method of manufacture of these fixtures or heads true radial magnetisation is not achievable leading to decreased actual accuracy. Axial magnets are simple and less expensive to produce and hence the above concerns do not apply.

Ideally the rotor comprises a substantially circular material to form a magnetic circuit around the magnetism detection device.

Preferably the substantially circular material is iron or a magnetic alloy.

In one embodiment the rotor is pivotally connected to a pedal arm for mounting to a vehicle.

In a further embodiment the rotor is pivotally connected to a throttle valve for sensing the position of the throttle valve.

Although the sensor is of similar overall size to the prior art the magnetic components and the stator components are of simpler and smaller geometry which results in less material being used and much simpler and hence less expensive tooling.

DETAILED DESCRIPTION OF THE INVENTION

Figure 2:
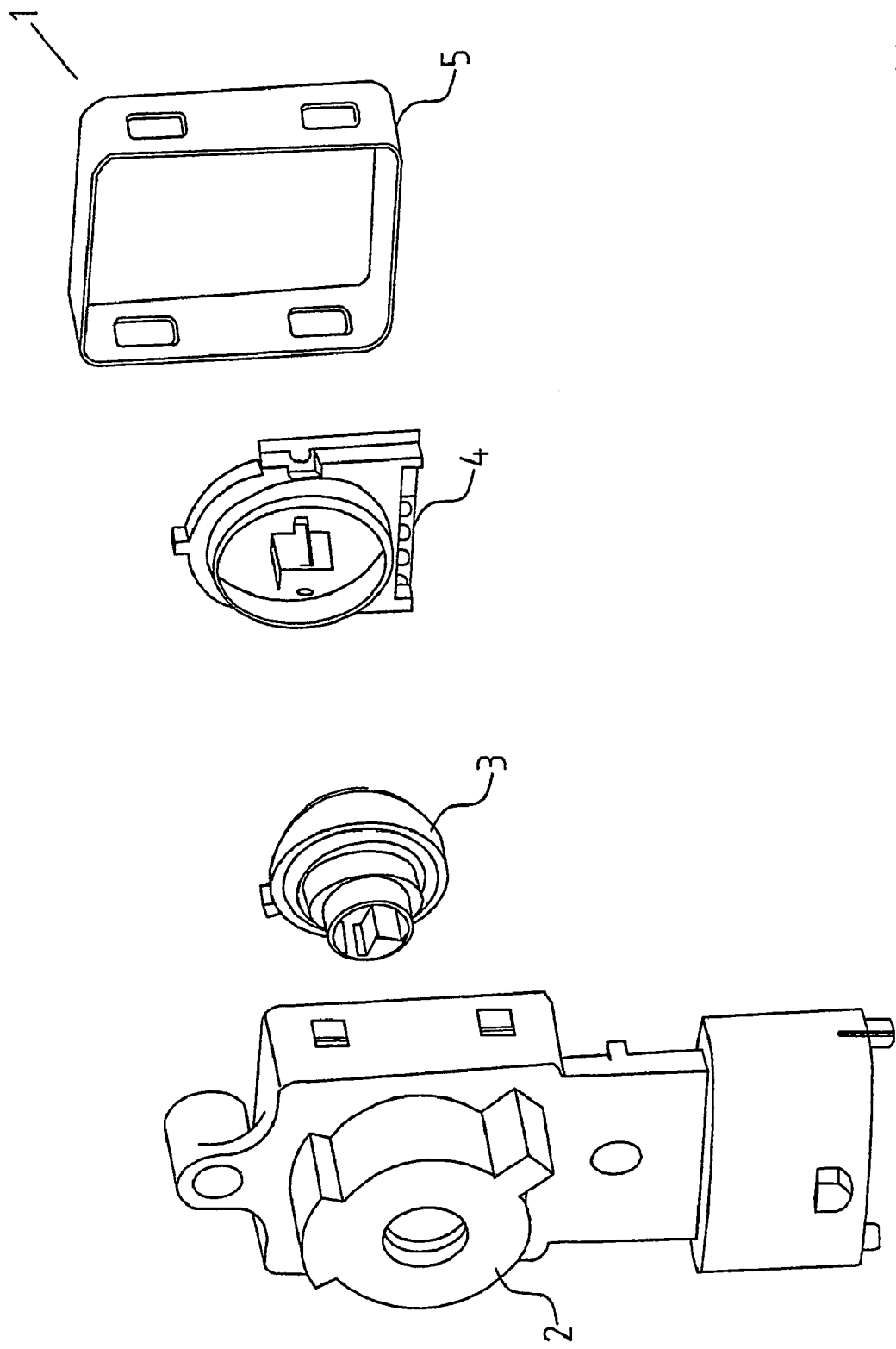
Figure 3:
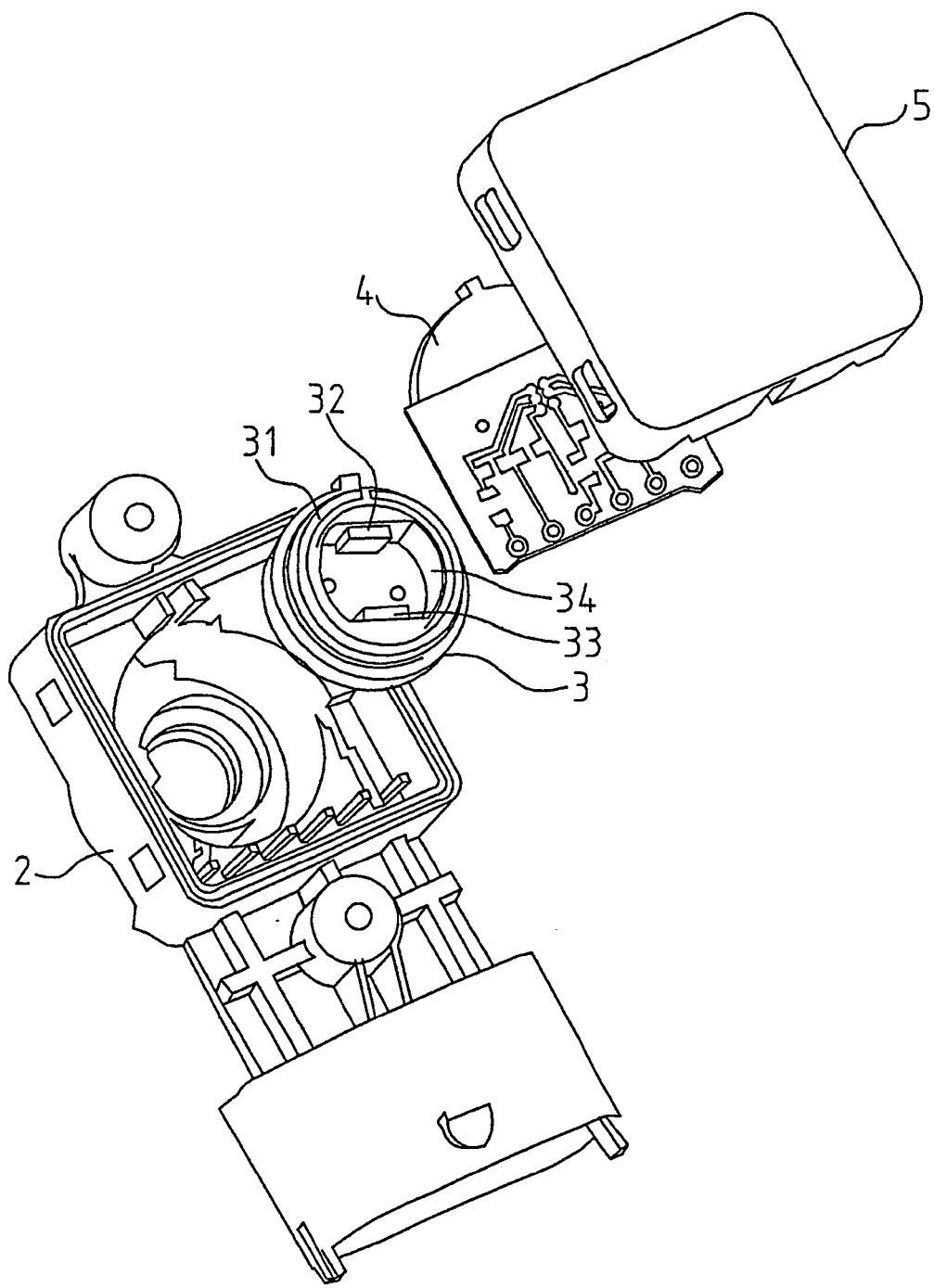
Figure 4:
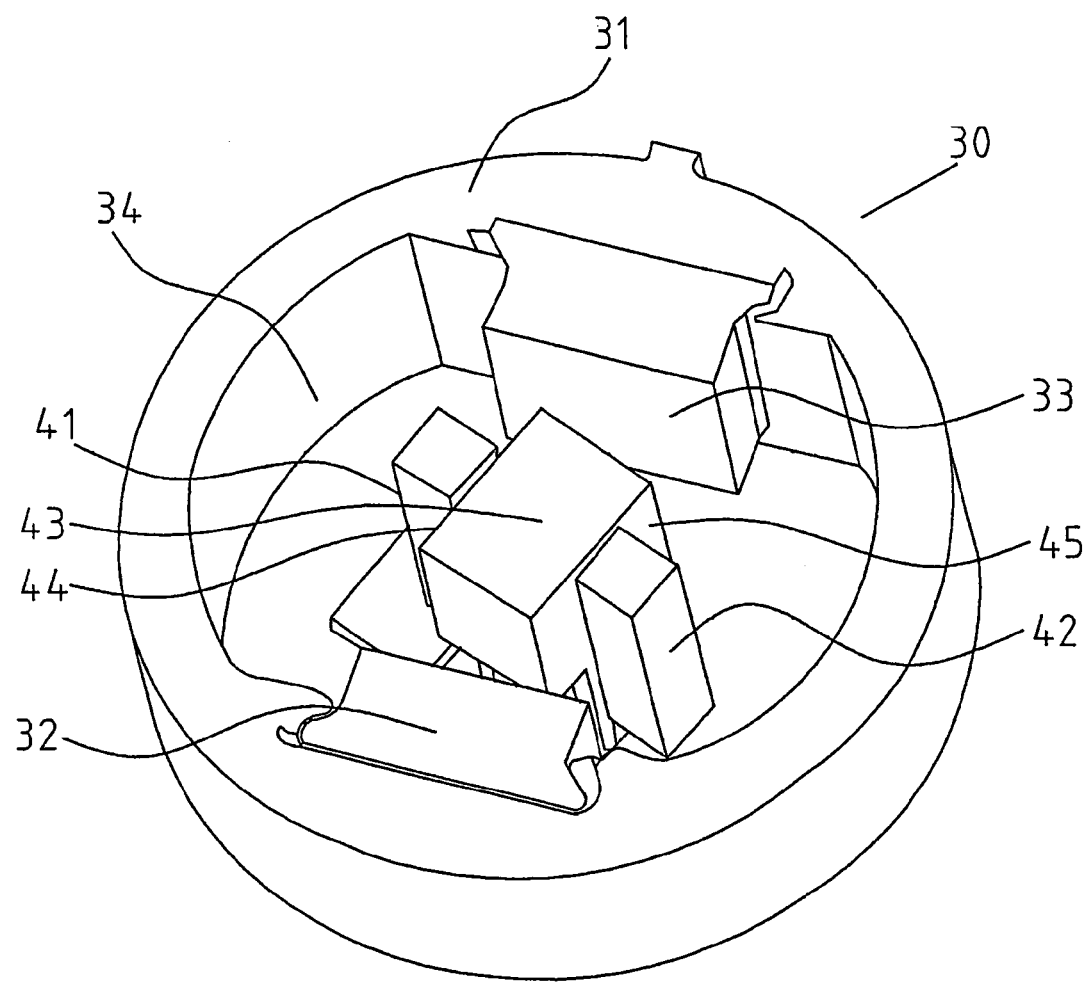
Figure 5:
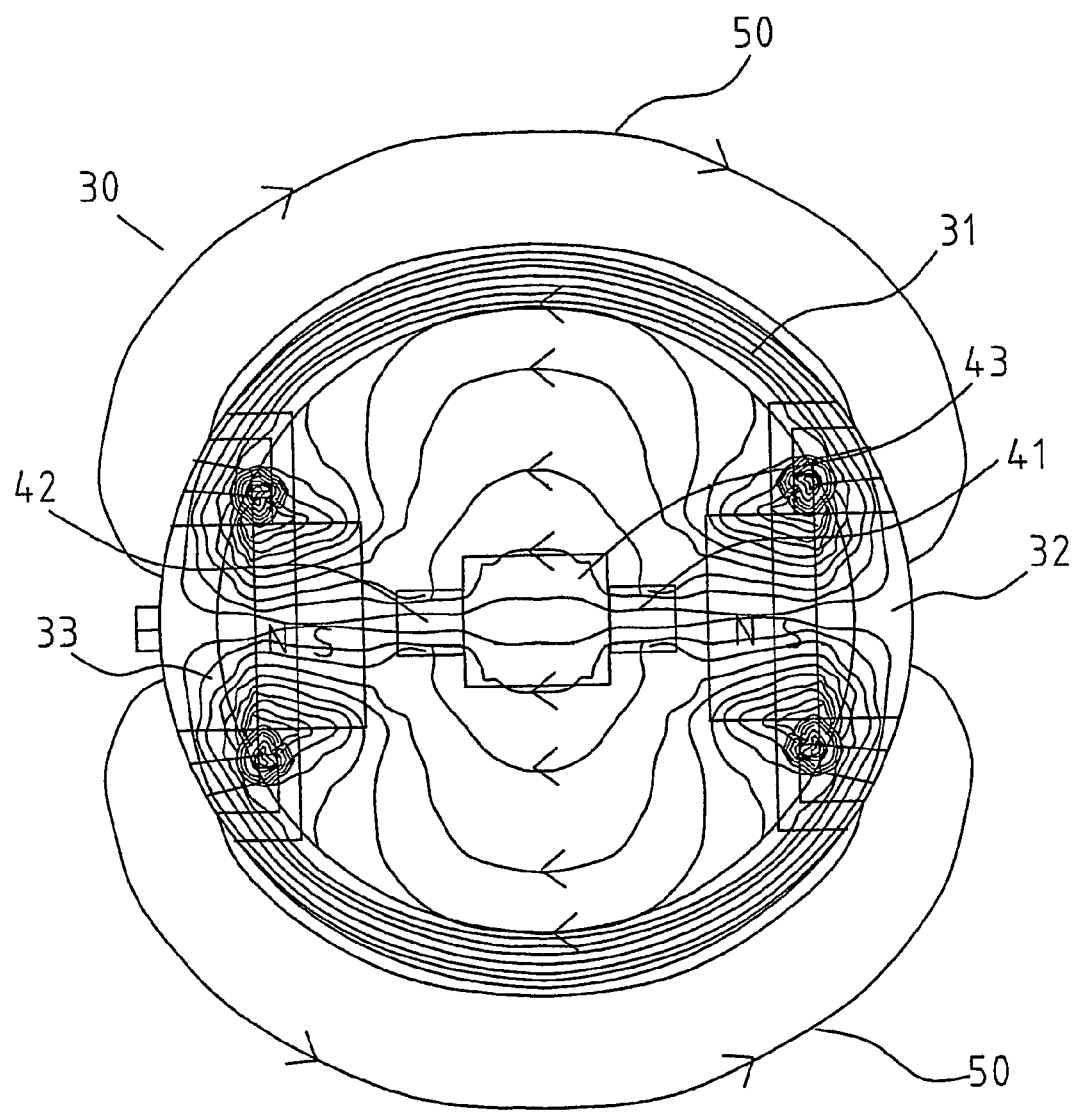
Figure 6A:
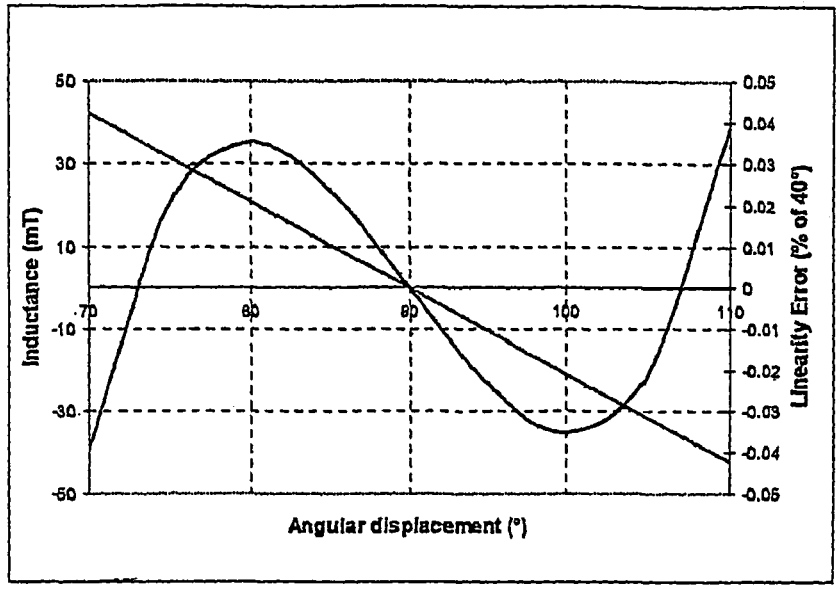
Figure 6B:
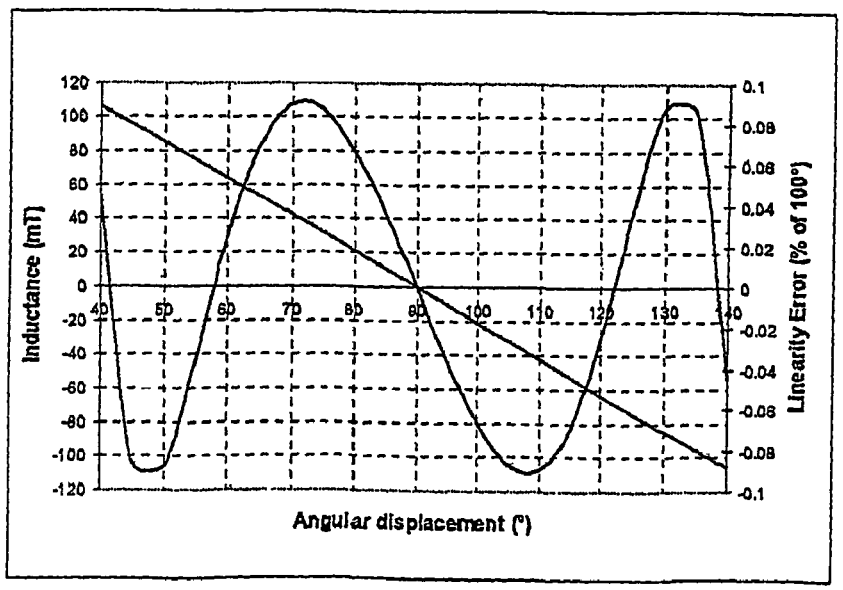
Figure 6C:
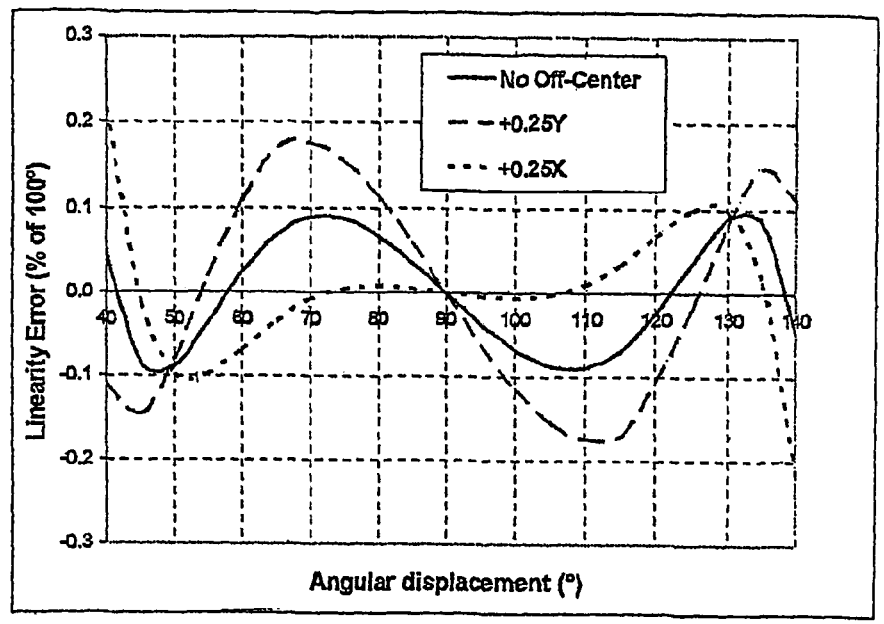
Figure 6D:
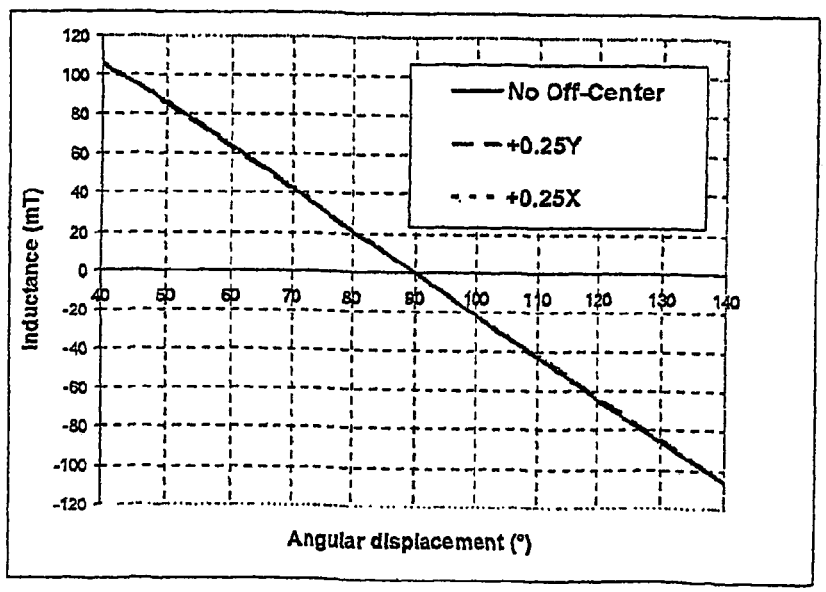
Figure 6E:
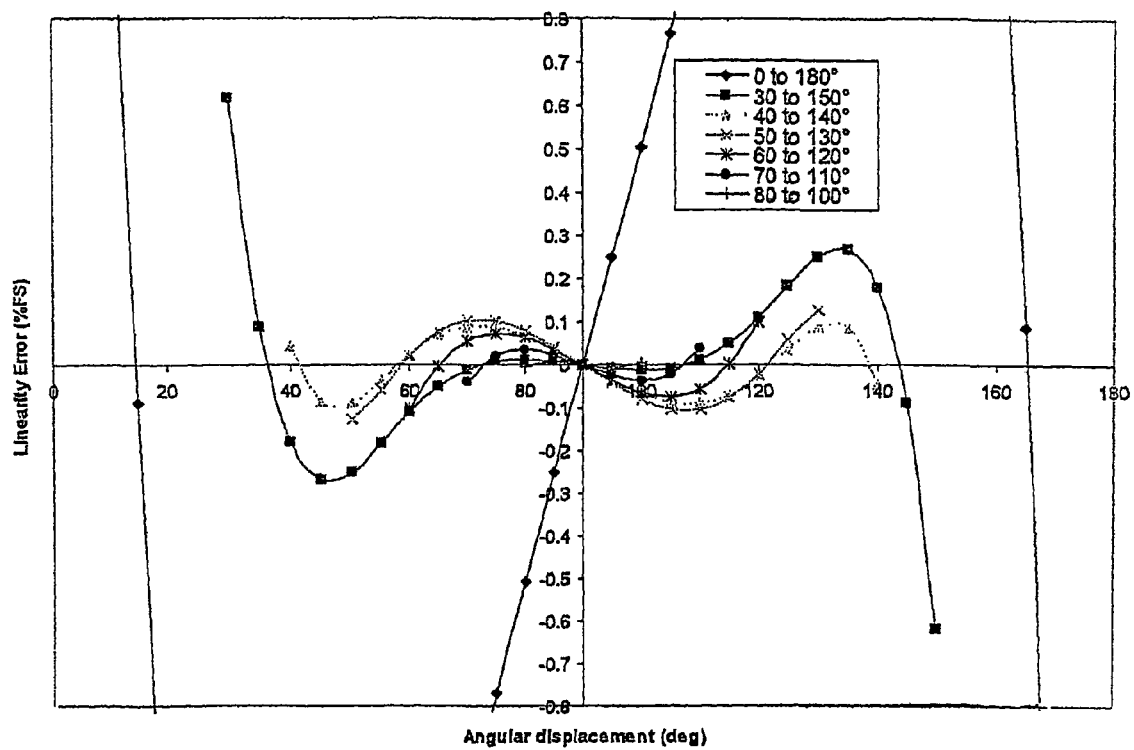
Figure 7:
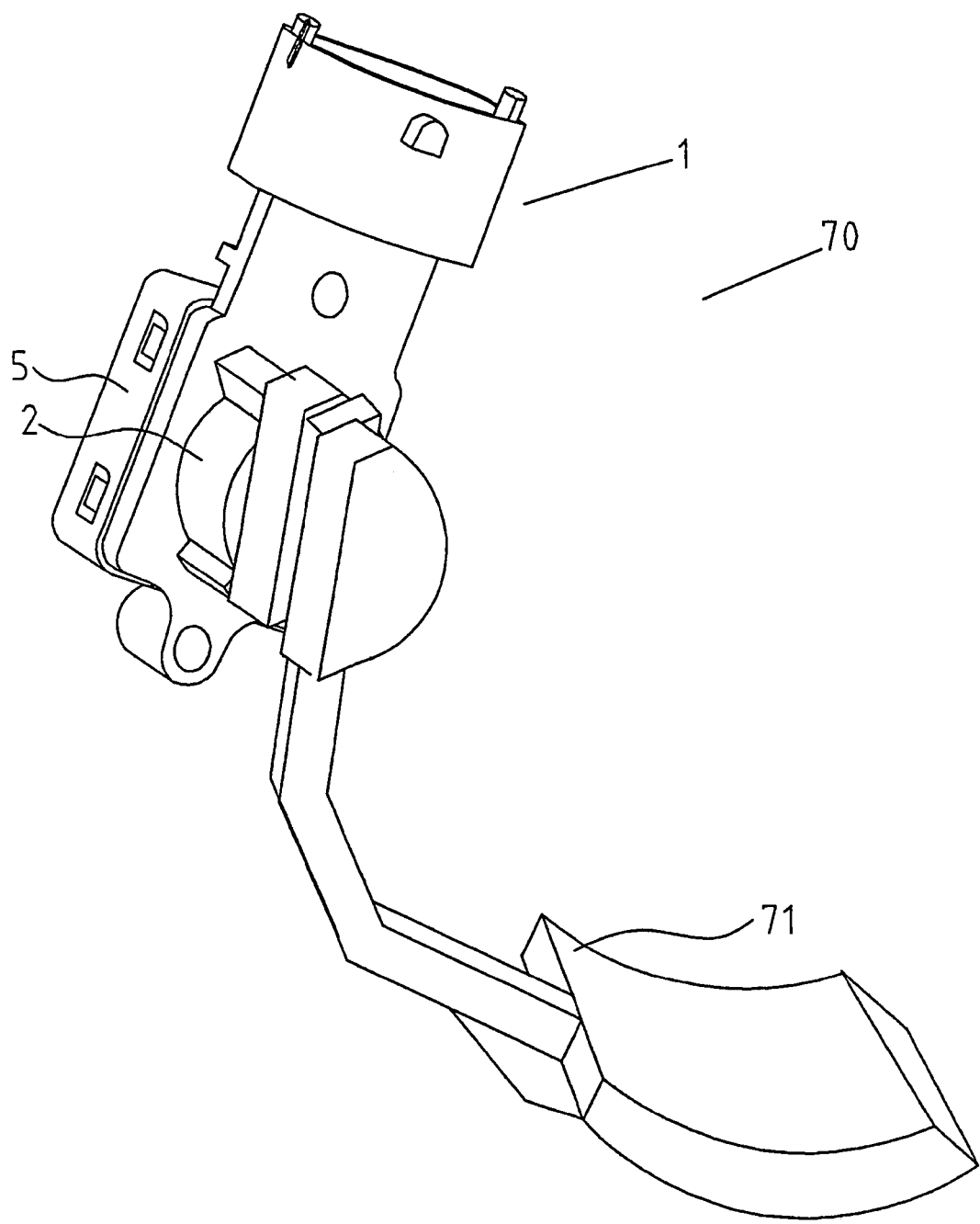

The present invention will be more clearly understood from the following description of some embodiments thereof, given by way of example only, with reference to the accompanying drawings, in which:

FIG. 1 is a front perspective view of an angular position sensor,

FIG. 2 is an exploded front perspective view of the angular position sensor of FIG. 1, FIG. 3 is an exploded rear perspective view of the angular position sensor of FIG. 1, FIG. 4 is a perspective view of a rotor assembly according to the present invention with a stator and a magnetism detection device positioned in the centre of the rotor, FIG. 5 is a part diagrammatic plan view of FIG. 4 illustrating a magnetic field, FIGS. 6(*a*) to (*e*) are graph results of different tests carried out on the angular position sensor, and FIG. 7 is a perspective view of an angular position sensor pivotally attached to a foot pedal of a vehicle.

Referring to FIGS. 1 to 3 inclusive, there is illustrated an angular position sensor according to the present invention illustrated generally by the reference numeral 1. The sensor 1 comprises a housing 2 connected to a rotor assembly 3 which in turn communicates with a PCB carrier assembly 4, all of which is encased by a cover 5. The rotor assembly 3 comprises a rotor 31 in which there is placed a pair of magnets 32, 33 on the inside face 34 of the rotor 31. The operation of the rotor assembly 3 will be discussed in more detail below.

Referring to FIG. 4 there is illustrated part of the rotor assembly, indicated generally by the reference numeral 30. The rotor 31, which is rotatable, has two magnets 32, 33, each magnet positioned substantially opposite each other and positioned on the inside face 34 of the rotor 31 forming a magnetic axis line. The PCB carrier assembly 4 has attached a magnetism detection device 43 which detects changes in inductance. A stator in the form of two stator pieces 41, 42 also attached to the PCB carrier assembly 4, are positioned either side of the magnetism detection device 43. The stator pieces 41, 42 are on an axis perpendicular to the front 44 and rear 45 faces of the magnetism detection device 43. When the angular position sensor 1 is fully assembled, the magnetism detection device 43 and the stator pieces 41 and 42 are positioned inside the rotor 31. It will be appreciated that the PCB carrier assembly 4 may be designed to be preassembled with the housing 5.

Referring to FIG. 5, the pair of axially magnetised magnets 32, 33 generate an axial magnetic field 50, in which the magnetism detection device 43 and stator pieces 41, 42 are positioned. It can be seen from FIG. 5 that the pair of magnets 32, 33 generate a symmetrical axial magnetic field 50 around the magnetism detection device 43. The pole face of each magnet 32, 33 faced toward the centre of the rotor 31 are of opposite polarity. For example the north pole N, of the magnet 32 face towards the centre means that the south pole S, of the magnet 33 faces the centre of the rotor 31. It will be appreciated that the poles can be positioned the other way round. The magnetic field 50 flows in the direction as shown in FIG. 5. The area between the two magnets 32, 33 forms an air gap. The stator pieces 41, 42 improves the flux concentration which ensures a closed loop symmetrical magnetic field 50 also ensures that the magnetic field lines are at approximately 90 degrees to the magnetism detection device, and also increases the accurate linear portion of the output curve is formed around the magnetism detection device 43.

FIGS. 6(*a*) to 6(*e*) disclose test results carried out on the sensor showing the linearity error versus the angular displacement and inductance output versus the angular displacement generated over a broad range of angular displacement which was modelled and evaluated on computer aided engineering software.

FIG. 7 discloses an application of the sensor 1 according to the present invention which illustrates the sensor is pivotally connected to a pedal arm for mounting to a vehicle which is pivotally attached to the rotor 31 (not shown).

In operation, the two magnets 32, 33 and the rotor 31 rotate around the magnetism detection device 43. The stator pieces 41, 42 and the magnetism detection device 43 are stationary and are securely attached to one of the faces of the PCB carrier 4. The rotor 31 which is substantially circular in shape provides a return closed loop for the magnetic field 50 which flows through the centre of the rotor 31, as well as reducing the effects from external interference and reducing inductance loss from the sensor. FIG. 5 depicts the sensor in the fully saturated position i.e. maximum inductance at the sensing element of the magnetism detection device. In this position the axis through the stator pieces 41, 42 is aligned with the axis line provided by the two magnets 32, 33 which provides a greater flux linkage for the magnetic field which allows for the symmetrical magnetic field 50 around the magnetism detection device 43. In practice the stator pieces 41, 42 and magnetism detection device 43 are angled to the axis line formed by the two magnets 32, 33 depending on the application required. The two magnets 32, 33 attached to the inside of the rotor 31 have been axially magnetised. As the rotor 31 and magnets 32, 33 rotate in response to an external force, the amount of which the rotor 31 rotates induces a change in magnetic flux which is detected by the magnetism detection device 43 which is then converted to an output signal indicative of the amount the rotor 31 has rotated. The magnetism detection device 43 may be a Hall effect device or integrated circuit which detects the induced change in magnetic flux which is then converted to a voltage proportional to the induced change in magnetic flux. The voltage output which is linear is a signal which indicates the amount the rotor 31 has rotated. It will be appreciated that GMR (Giant Magneto Restrictive) and integrated circuits can also be used which detect the angle of the magnetic field.

The main feature of the present invention is to provide a pair of magnets 32, 33 attached to the inside face 34 of the rotor 31 having a pole of opposite polarity directed towards the centre of the rotor 31 and positioned substantially opposite each other. It will be appreciated that the magnets 32, 33 need only be magnetised axially which is much easier to magnetise and less expensive. The prior art discloses two circular magnets on the rotor which requires each magnet to be circumferentially magnetised. This is difficult and expensive to achieve. One prior art sensor discloses one magnet attached to the inside face of the rotor which is axially magnetised. However, this as already discussed is not a very accurate sensor for both small and large angular displacements of the rotor 31.

Another important feature of the present invention is the shape of the stator which is provided by the stationary stator pieces 41, 42 positioned substantially at either side of the magnetism detection device 43 which concentrates the flux to provide a more accurate measurement of the angular displacement of the sensor. The prior art discloses circular pieces for concentrating the flux. The stator pieces 41, 42 are of simpler and smaller geometry this saves on material costs, while at the same time improves the linearity output signal from the magnetism detection device.

It is important that the sensor 1 provides a linear output signal representative of the angular displacement of the rotor 31 over a broad range of angular displacement. The magnetism detection device 43 which, as already mentioned, may be a Hall effect device or an integrated circuit, stores software which reads the inductance value of the changing magnetic field in response to the rotor 31 rotating and allocates a proportional voltage to the inductance observed. Any external control device (not shown) for example an engine management unit, which reads the output from the sensor, can determine the angle of rotation of the rotor 31 which is proportional to the generated voltage. As the external control device only reads voltage, it is important to have equal incremental angular movements resulting in equal inductance increments and hence, equal voltage increments, for a particular angular rotation. For this reason, the software within the control device requires a linear voltage output when voltage is plotted against the angular displacement of the rotor 31. This is particularly important, for example, automotive applications, as illustrated in FIG. 7. The rotor is pivotally connected to an accelerator pedal 71 of a vehicle. As the pedal 71 is pressed or depressed, the rotor 31 rotates. As more and more vehicles are now controlled by electronics, it is important to provide an electrical signal to control the vehicle in response to the pedal 71 accurately over small angles of rotation. Another feature of the present invention is that the rate of change of voltage measured can determine the speed at which a foot pedal is pressed to provide an appropriate control signal to the vehicle.

FIG. 6a is a graph of the inductance variation generated when the rotor is rotated through 40 degrees and also the linearity error of the plotted straight line output i.e. the linear line is the output plotted against the angle of rotation and the curved line is the associated linearity error of that line. The rotor 31 and stator pieces 41, 42 are symmetric about the same axis. The inductance is measured at the centre of the rotor 31 by the magnetism detection device 43 which is converted into a directly proportional voltage output by the magnetism detection device 43, for example a Hall device. An Engine Management unit (not shown) has this straight line output programmed into its memory and hence by monitoring the voltage output of the device the angle of rotation of the pedal or valve for example is known. It is also possible for the Engine Management Unit to monitor the acceleration of the pedal or valve and hence the sensor can become an accelerator sensor by measuring the rate of change of voltage. The magnetism detection device 43 may incorporate temperature compensation software which corrects the output in cases of temperature variation if required.

FIG. 6b is the same as FIG. 6a but for a rotation of 100 degrees.

FIG. 6c is the same as FIG. 6b but the magnetism detection device 43 plus stator pieces 41, 42 is offset from the rotor 31 centre in x and y by 0.25 mm to take account of mechanical tolerances and to show the effect of wear with age on the bearing faces. The three output curves are depicting linearity error with no offset, 0.25 mm in the Y direction and 0.25 mm in the X direction. This demonstrates a large improvement over the prior art in that it is four times more accurate which is illustrated in the table below.

FIG. 6d is the same as FIG. 6c but the graph is of the output inductance, proportional to voltage, plotted against the angle of rotation of the rotor.

FIG. 6e is the same as FIG. 6a but this depicts the linearity error of the sensor over different angles of rotation ranging from 20 degrees to 180 degrees. Note that the accuracy at larger angles of rotation can be enhanced by offsetting the stator pieces 41, 42 plus the magnetism detection device 43 in the direction of 90 degrees from the axis line formed by the two magnets 32, 33 in the fully saturated position, see FIG. 5.

The following table compares the sensor of the present invention with other similar type sensors in the marketplace, namely, against sensors manufactured by Moving Magnet Technology (MMT) Corporation, Wabash Corporation and CTS Corporation over a range of tests:

| SENSOR TYPE | KEANE INVENTION | MMT | WABASH | CTS |
|---|---|---|---|---|
| Direction of magnetisation | Axial | Radial | Axial | Axial |
| Linearity on +/− 20° | <0.05% | <0.1% | <0.3% | Dependent on parts quality |
| Linearity on +/− 50° | <0.1% | <0.15% | <2.0% | Dependent on parts quality |
| Influence of off-centring on linearity error | <0.25% | <1.0% | Very high | Very high |
| CONCLUSION | Good sensitivity Good linearity on short and large strokes Very low sensitivity to off-centring | Good sensitivity Good linearity on short and large strokes Low sensitivity to off-centring | Low sensitivity Large air gap Non linear on large strokes | Low sensitivity High sensitivity to off-centring High sensitivity to temperature |

As can be seen, the linearity error of the output voltage of the present invention is much more favourable than any other sensors of the three companies compared.

In a preferred embodiment of the present invention, the axis line formed by the two magnets 32, 33 substantially intersects the centre axis of rotation of the rotor 31. Further, the stator pieces 41, 42 are positioned substantially either side of the centre axis and on substantially the same axis line formed by the two magnets 32, 33 at full saturation. However, it will be appreciated that in another embodiment, the axis line formed by the two magnets 32, 33 may be offset from the centre axis of rotation of the rotor 31 in some applications. If the axis line through the two magnets 32, 33 and another axis line formed by the two stator pieces 41, 42 and align the two through axis of rotation at the rotor 31 then the inductance seen by the magnetism detection device 43 is fully saturated or at a maximum. When these two axis lines are at 90 degrees. Then the magnetism detection device 43 experiences zero inductance. Hence the resting point of the rotor 31 varies depending on the angle of rotation being monitored for example monitoring at 90 degrees. Then the rest point will be 45 degrees. At one side of this axis or zero inductance position in a clockwise direction and the maximum angular rotation will be 45 degrees. In the other direction 45 degrees from this axis, hence counter clockwise thus giving 90 degrees angular sensing.

It will also be appreciated that the stator pieces 41, 42 can be of various cross-sectional shape or size. However, it has been found that a particular suitable pole piece cross-sectional shape is a square or a semi-octagonal pole piece. The magnetism detection device 43 may have a single, dual output or quadruple output option depending on the application required.

The rotor 31 which is made of iron or magnetic alloy provides protection from electrical interference and ensures a closed loop path for the magnetic field 50. The rotor 31 does not have to be circular and may be eliptical or of a shape that provides a closed loop magnetic path. Further it will be appreciated that means may be provided to rotate the magnets 32, 33 only on the inside face of the rotor.

It will be appreciated that the invention will work without the stator pieces 41, 42. What the stator pieces 41, 42 do is increase the linear portion of the output inductance/voltage curve as well as increasing accuracy i.e. less linearity error. However, if the angular rotational requirement application is very small, one may find that there is a portion of the curve which is of sufficiently linear accuracy of the sensor 1. The stator pieces 41, 42 are usually required for large angular rotations. However, for sensors of less strict accuracy requirements and small angles of rotation, it may be possible to manufacture the sensor without the stator pieces 41, 42.

The sensor of the present invention is capable of accurately sensing large and small angular rotations of a device and hence is suitable for application to, such as intelligent valves, pedal position sensing, as illustrated in FIG. 7, throttle position sensing and exhaust gas recirculation valve position sensing which are being used more and more in automotive applications.

It will be appreciated that while an angular position sensor is disclosed for automotive applications the sensor may be used in other industrial applications.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiment hereinbefore described, but may be varied in both construction and detail within the scope of the appended claims.

The invention claimed is:

1. An angular position sensor comprising two magnets attached to a rotor for generating a magnetic field and a magnetism detection device disposed in the magnetic field for detecting changes in the magnetic field on rotation of the rotor so that the angular position of the rotor is detected based on the changes in the magnetic field to provide an output signal from the magnetism detection device indicating the angular position of the rotor, wherein a flux concentrating stator provided comprising a pair of stator pieces is positioned substantially on either side of the magnetism detection device and the two magnets are positioned substantially opposite to each other so that a face of a pole of one magnet faces a face of a pole of the other magnet and the two other poles face away from each other, the pole faces defined between an upper edge and a lower edge spaced apart by two side edges and wherein the length of the upper edge or the lower edge of each pole face is substantially three times the length of an edge of the stator pieces.

2. The angular position sensor as claimed in claim 1, in which the axis line formed by the two magnets substantially intersects the centre axis of rotation of the rotor.

3. The angular position sensor as claimed in claim 1 in which the facing poles of each magnet are of opposite polarity.

4. The angular position sensor as claimed in claim 1, in which the stator pieces are substantially on the same axis line formed by the two magnets when in a fully saturated position.

5. The angular position sensor as claimed in claim 1 in which the magnetism detection device and the stator pieces are positioned offset from the centre of the rotor.

6. The angular position sensor as claimed in claim 1, in which the magnets are attached to the inside face of the rotor.

7. The angular position sensor as claimed in claim 1, in which the magnetism detection device is one of a hall effect device, an integrated circuit or a GMR (Giant Magneto Restrictive) device.

8. The angular position sensor as claimed in claim 1, in which the magnets are axially magnetized.

9. The angular position sensor as claimed in claim 1, in which the rotor comprises a substantially circular material to form a magnetic circuit around the magnetism detection device.

10. The angular position sensor as claimed in claim 9, in which the substantially circular material is iron or a magnetic alloy.

11. The angular position sensor as claimed in claim 1, wherein the rotor is pivotally connected to a pedal arm for mounting to a vehicle.

12. The angular position sensor as claimed in claim 1, wherein the rotor is pivotally connected to a throttle valve for sensing the position of the throttle valve.

13. The angular position sensor as claimed in claim 1, in which the rotor has an inside diameter which is substantially three times the length of the upper edge or the lower edge of each pole face.

* * * * *